US012629728B2

(12) United States Patent
Seo et al.

(10) Patent No.: US 12,629,728 B2
(45) Date of Patent: May 19, 2026

(54) WAFER CLEANING APPARATUS

(71) Applicant: Samsung Electronics Co., Ltd., Suwon-si (KR)

(72) Inventors: Jieun Seo, Suwon-si (KR); Donghoon Kwon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 157 days.

(21) Appl. No.: 18/392,348

(22) Filed: Dec. 21, 2023

(65) Prior Publication Data

US 2024/0238849 A1 Jul. 18, 2024

(30) Foreign Application Priority Data

Jan. 12, 2023 (KR) ........................ 10-2023-0004726

(51) Int. Cl.
*B08B 3/02* (2006.01)
*B05B 1/02* (2006.01)

(52) U.S. Cl.
CPC ................ *B08B 3/024* (2013.01); *B05B 1/02* (2013.01); *B08B 2203/02* (2013.01)

(58) Field of Classification Search
None
See application file for complete search history.

(56) References Cited

U.S. PATENT DOCUMENTS 6,106,635 A * 8/2000 Hamada .................... B08B 1/34 134/32
10,005,092 B2 6/2018 Oh et al.
2008/0041430 A1* 2/2008 Cho .................. H01L 21/67051 134/58 R
2012/0227770 A1* 9/2012 Kaneko ................... B05B 7/061 134/102.1
2019/0057882 A1* 2/2019 Kim .......................... B08B 3/02
2022/0016651 A1* 1/2022 Oikawa ..................... B08B 3/02

FOREIGN PATENT DOCUMENTS

JP 5031542 B2 9/2012
KR 100616248 B1 8/2006
KR 10-2007-0071503 A 7/2007
KR 101418360 B1 7/2014
KR 101704494 B1 2/2017
KR 101776019 B1 9/2017
KR 10-2020-0056045 A 5/2020
KR 102389224 B1 4/2022

* cited by examiner

*Primary Examiner* — Cristi J Tate-Sims
(74) *Attorney, Agent, or Firm* — HARNESS, DICKEY & PIERCE, P.L.C.

(57) ABSTRACT

A wafer cleaning apparatus including a rotating plate configured to support a wafer thereon, and a cleaning unit above the rotating plate and configured to spray cleaning water, wherein the cleaning unit includes a body, a nozzle in the body, at least one supply pipe connected to the nozzle and configured to supply a cleaning substance, and a discharge member at a lower end portion of the nozzle and configured to discharge the cleaning water, which includes the cleaning substance, wherein the discharge member has a spraying port configured spray the cleaning water therethrough, and wherein the spraying port has an X shape may be provided.

14 Claims, 6 Drawing Sheets

WAFER CLEANING APPARATUS

CROSS-REFERENCE TO RELATED APPLICATION

This application claims the priority and benefit of Korean Patent Application No. 10-2023-0004726, filed on Jan. 12, 2023, with the Korean Intellectual Property Office, the entire contents of which are incorporated herein by reference.

BACKGROUND

1. Field

The present inventive concepts relate to wafer cleaning apparatuses.

2. Description of Related Art

Cleaning of a wafer after a CMP process polishing a surface of the wafer using chemical and mechanical interaction is performed by using a non-contact cleaning method that does not re-contaminate particles removed during the CMP process. This cleaning method is a method of removing particles by mixing carbonated water mixed with carbon dioxide in distilled water with nitrogen gas to remove particles with searing force of small droplets.

However, if the searing force of small droplets is increased, such as an increase in a flow rate of nitrogen to increase a removal force of particles, there is a problem that adverse effects such as non-specific oxidation due to frictional static electricity occur.

SUMMARY

The present inventive concepts provide wafer cleaning apparatuses capable of improving removal force of particles.

According to an aspect of the present inventive concepts, a wafer cleaning apparatus includes a rotating plate configured to support a wafer thereon, and a cleaning unit above the rotating plate and configured to spray cleaning water, wherein the cleaning unit includes a body above the rotating plate, a nozzle in the body, at least one supply pipe connected to the nozzle and configured to supply a cleaning substance, and a discharge member at a lower end portion of the nozzle and configured to discharge the cleaning water, which includes the cleaning substance, wherein the discharge member has a spraying port configured to spray the cleaning water therethrough, and wherein the spraying port has an X shape.

According to an aspect of the present inventive concepts, a wafer cleaning apparatus includes a rotating plate configured to support a wafer thereon, and a cleaning unit above the rotating plate and configured to spray cleaning water. The cleaning unit includes a body above the rotating plate, a nozzle in the body, at least one supply pipe connected to the nozzle and configured to supply a cleaning substance, and a discharge member at a lower end portion of the nozzle and configured to discharge the cleaning water, which includes the cleaning substance. The discharge member includes a spraying port having an X shape, the spraying port configured to spray the cleaning water therethrough while being rotated.

BRIEF DESCRIPTION OF DRAWINGS

The above and other aspects, features, and advantages of the present inventive concepts will be more clearly understood from the following detailed description taken in conjunction with the accompanying drawings, in which.

DETAILED DESCRIPTION

Hereinafter, some example embodiments of the present inventive concepts will be described with reference to the accompanying drawings as follows.

Figure 1:
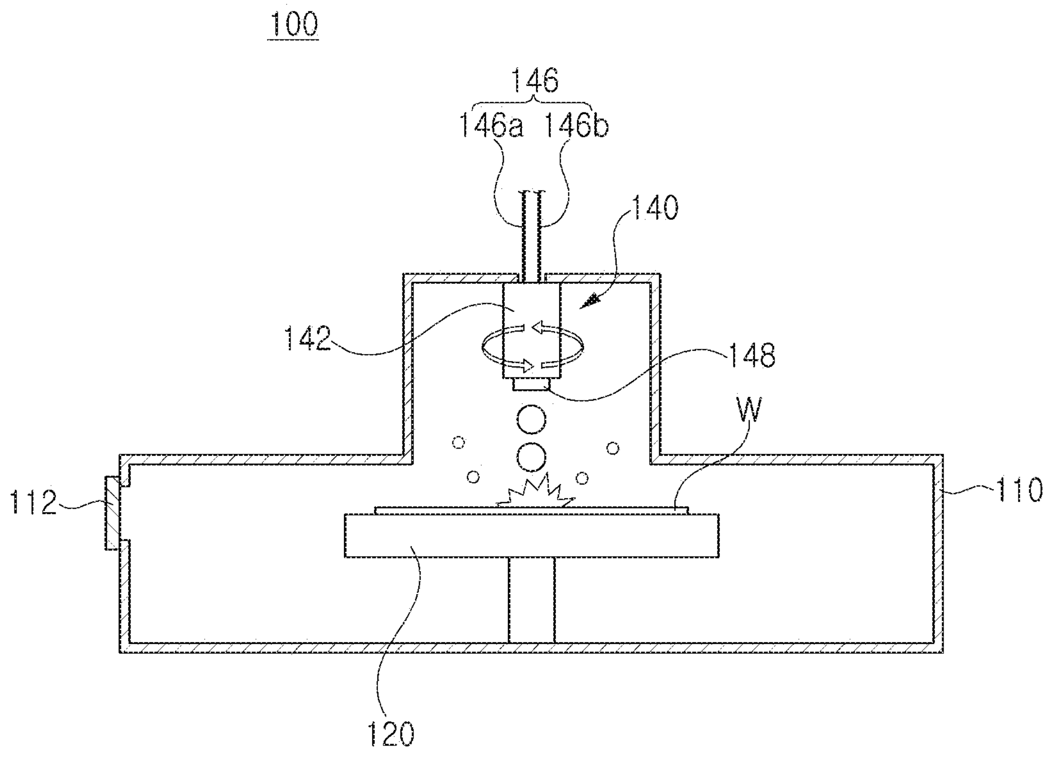
FIG. 1 is a configuration diagram illustrating a wafer cleaning apparatus according to an example embodiment.
Figure 2:
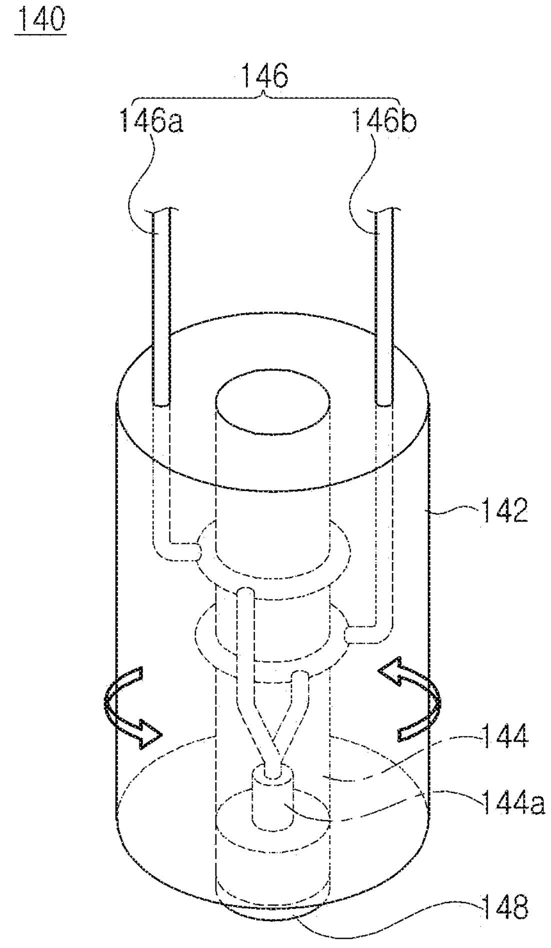
FIG. 2 is a configuration diagram illustrating a cleaning unit of a wafer cleaning apparatus according to an example embodiment.
Figure 3:
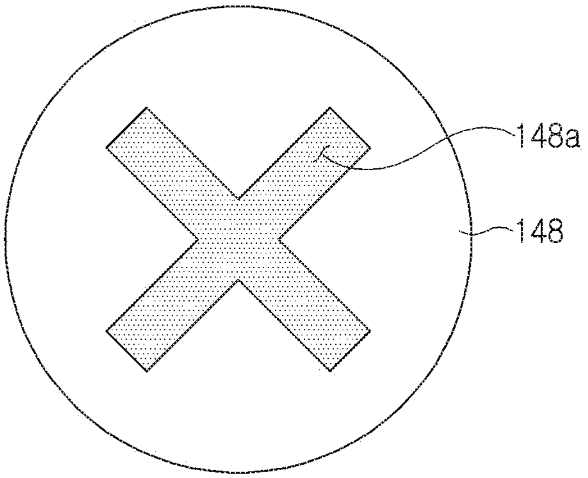
FIG. 3 is a bottom view illustrating a discharge member of a cleaning unit according to an example embodiment.
Figure 4:
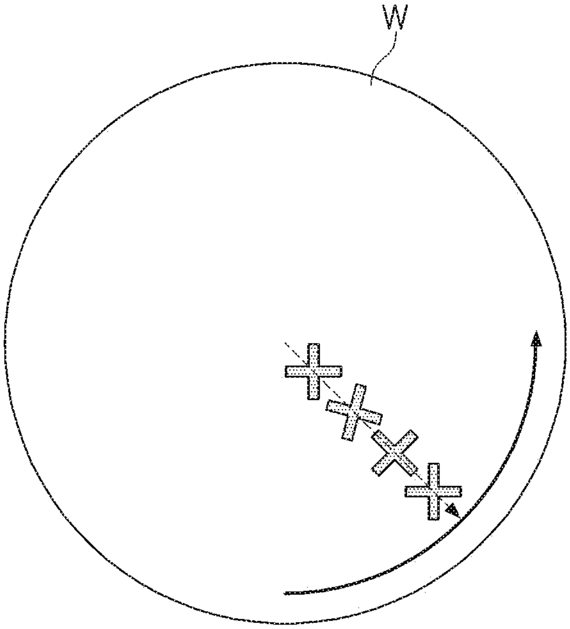
FIGS. 4 and 5 are explanatory diagrams illustrating an operation of a wafer cleaning apparatus according to an example embodiment.
Figure 5:
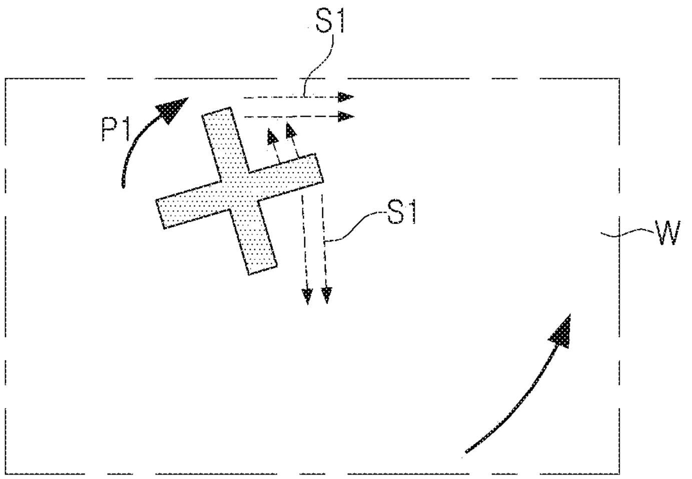

FIG. 1 is a configuration diagram illustrating a wafer cleaning apparatus according to an example embodiment, and FIG. 2 is a configuration diagram illustrating a cleaning unit of a wafer cleaning apparatus according to an example embodiment. FIG. 3 is a bottom view illustrating a discharge member of a cleaning unit according to an example embodiment. FIGS. 4 and 5 are explanatory diagrams illustrating an operation of a wafer cleaning apparatus according to an example embodiment.

Referring to FIGS. 1 and 2, a wafer cleaning apparatus 100 according to an example embodiment includes a chamber 110, a rotating plate 120, and a cleaning unit 140.

The chamber 110 has an internal space, and the rotating plate 120 and the cleaning unit 140 are disposed in an internal space of the chamber 110. Meanwhile, as an example, the chamber 110 may include an inlet/outlet 112 through which the wafer W is moved in and out.

The rotating plate 120 may have a circular plate shape. In addition, a wafer W is seated on an upper surface of the rotating plate 120. Meanwhile, a rotating driving unit (not shown) may be connected to the rotating plate 120 so that the rotating plate 120 may be rotated while the wafer W is being cleaned. As an example, the rotating plate 120 may be rotated clockwise or counterclockwise.

The cleaning unit 140 is disposed above the rotating plate 120 and sprays cleaning water. As an example, the cleaning unit 140 includes a body 142, a nozzle 144, a supply pipe 146 and a discharge member 148.

The body 142 may have a hollow cylindrical shape, for example. The body 142 may be configured to be rotatable in forward and reverse directions (e.g., As an example, the body 142 may be connected to a driving unit (not shown) and rotated in an order of the forward and reverse directions. Here, the forward direction refers to a direction rotating clockwise, and the reverse direction refers to a direction rotating counterclockwise. The body 142 may be configured to move between a central portion and an edge of the wafer W. To this end, the body 142 may be connected to a linear driving unit (not shown) installed in the chamber 110. For example, the linear driving unit may be configured to include a motor (not shown) and a rack-pinion gear (not shown) connected to the motor.

As an example, a rotational force of the motor may be transmitted to the body 142 through a rack-pinion gear and configured so that the body 142 moves between the central portion and the edge of the wafer W. However, example embodiments thereof are not limited thereto, and the linear driving unit may be composed of a cylinder connected to the body 142. Accordingly, when cleaning water is sprayed through the discharge member 148, the body 142 may move from the central portion to the edge of the wafer W or from the edge to the central portion of the wafer W.

The nozzle 144 may be disposed in a central portion of the body 142. Meanwhile, a supply pipe 146 may be connected to the nozzle 144 and a mixing unit 144*a* in which a cleaning material supplied through the supply pipe 146 is mixed may be provided.

The mixing unit 144*a* may be provided in a lower end portion of the nozzle 144, and the cleaning material supplied through the supply pipe 146 may be mixed in the mixing unit 144*a* and then discharged to the wafer W through the discharge member 148. Meanwhile, the nozzle 144 may be rotated in conjunction with the body 142.

The supply pipe 146 may include a first supply pipe 146*a* connected to the nozzle 144 and supplied with a first fluid, and a second supply pipe 146*b* connected to the nozzle 144 and supplied with a second fluid. As an example, the first fluid may be a mixed fluid of distilled water in a liquid state and carbon dioxide in a gaseous state, and the second fluid may be nitrogen in a gaseous state. Meanwhile, the first supply pipe 146*a* and the second supply pipe 146*b* may be wound around the nozzle 144 and then connected to the mixing unit 144*a* provided in the nozzle 144. As described above, because the first and second supply pipes 146*a* and 146*b* are connected to the mixing unit 144*a* disposed in the lower end portion of the nozzle 144, nitrogen gas, distilled water, and carbon dioxide gas may be maintained in a separated state so that the cleaning power by the cleaning water may be increased.

The discharge member 148 is installed on a bottom surface of the nozzle 144, and discharges cleaning water. Meanwhile, the discharge member 148 sprays the cleaning water while being rotated, and the discharge member 148 may have a spraying port 148*a* through which the cleaning water is sprayed. As an example, the spraying port 148*a* may have an 'X' shape, as illustrated in FIG. 3. In addition, the spraying ports 148*a* having an 'X' shape and an angle between two bars of the "X" shape may be approximately 90 degrees. Then, the spraying port 148*a* of the discharge member 148 sprays the cleaning water while being rotated. Accordingly, the removal force of particles by the cleaning water may be improved.

Looking at this in more detail, as illustrated in FIG. 4, a wafer W seated on the rotating plate 120 (see FIG. 1) may be rotated counterclockwise, for example. Then, the body 142 (see FIG. 2) sprays cleaning water while moving from a central portion of the wafer W to an edge of the wafer W. In this case, because the cleaning water is sprayed through the spraying port 148*a* (see FIG. 3) of the discharge member 148 (see FIG. 3), the cleaning water may be sprayed in an X shape.

because the discharge member 148 sprays the cleaning water while being rotated together with the body 142, as illustrated in FIG. 5, a rotational force P1 indicated by a solid line is applied to the cleaning water. Accordingly, the cleaning water sprayed by the spraying port 148*a* may be subjected to particle removal twice in a scattering direction of particles S1 indicated by the dotted line in FIG. 5. Accordingly, removal force of particles may be improved.

As described above, because the cleaning water is sprayed through the nozzle 144 installed in the rotating body 142, the removal force of particles may be improved. In addition, because the spraying port 148*a* of the discharge member 148 has an X shape, the removal force of particles can be further improved. Furthermore, because the mixing unit 144*a* is disposed in a lower end portion of the nozzle 144, nitrogen gas, distilled water, and carbon dioxide gas can be maintained in a separated state, so that cleaning power by the cleaning water can be further improved.

Figure 6:
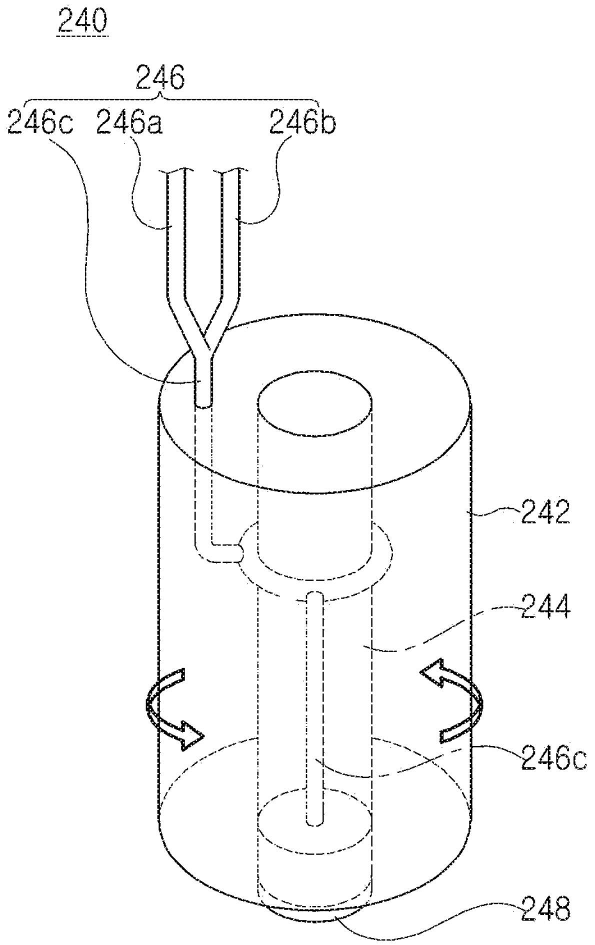
FIG. 6 is a configuration diagram illustrating a cleaning unit of a wafer cleaning apparatus according to an example embodiment.

FIG. 6 is a configuration diagram illustrating a cleaning unit a wafer cleaning apparatus according to an example embodiment.

Referring to FIG. 6, a cleaning unit 240 according to an example embodiment includes, for example, a body 242, a nozzle 244, a supply pipe 246, and a discharge member 248.

The body 242 may have a hollow cylindrical shape, for example. The body 242 may be configured to be rotatable in forward and reverse directions. As an example, the body 242 may be connected to a driving unit (not shown) and rotated in an order of the forward and reverse directions. The body 242 may be configured to move between a central portion and an edge of a wafer W. As an example, when cleaning water is sprayed through the discharge member 248, the body 242 may move from the central portion to the edge of the wafer W or from the edge to the central portion of the wafer W.

The nozzle 244 may be disposed in a central portion of the body 242. Meanwhile, a supply pipe 246 may be connected to the nozzle 244. Meanwhile, a cleaning substance supplied through the supply pipe 246 may be discharged to the wafer W through the discharge member 248. To this end, the nozzle 244 may be provided with a flow path (not shown) through which the cleaning material flows. Meanwhile, the nozzle 244 may be rotated in conjunction with the body 242.

The supply pipe 146 may be provided with a first supply pipe 246*a* connected to the nozzle 244 and supplied with a first fluid, and a second supply pipe 246*b* connected to the nozzle 244 and supplied with a second fluid. As an example, the first fluid of distilled water in a liquid state and carbon dioxide in a gaseous state, and the second fluid may be nitrogen in a gaseous state.

Meanwhile, the supply pipe 246 may further include a mixing pipe 246*c* connected to the first supply pipe 246*a* and the second supply pipe 246*b* and in which the first fluid and the second fluid are mixed. As an example, a portion in which the mixing pipe 246*c* is connected to the first supply pipe 246*a* and the second supply pipe 246*b* may be disposed outside the body 242. For example, the first fluid and the second fluid may be mixed in an upper end portion of the mixing pipe 246*c* disposed outside the body 142 and then flow into the mixing tube 246*c* disposed inside the body 242. Meanwhile, the mixing pipe 246*c* may be connected to the nozzle 244 after being wound around an outer surface of the nozzle 244.

The discharge member 248 is installed on a bottom surface of the nozzle 244 to discharge cleaning water. Meanwhile, the discharge member 248 sprays the cleaning water while being rotated, and the discharge member 248 may have a spraying port 148*a* through which the cleaning water is sprayed (see FIG. 3). As an example, the spraying port 148*a* may have an 'X' shape as illustrated in FIG. 3 Accordingly, removal force of particles by the cleaning water may be improved.

Figure 7:
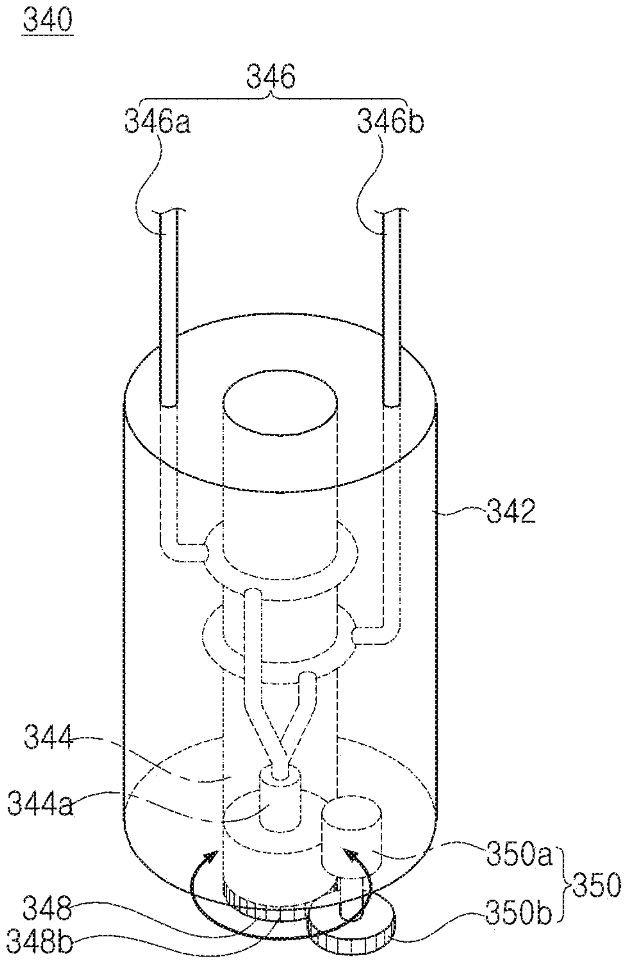
FIG. 7 is a configuration diagram illustrating a cleaning unit of a wafer cleaning apparatus according to an example embodiment.

FIG. 7 is a configuration diagram illustrating a cleaning unit of a wafer cleaning apparatus according to an example embodiment.

Referring to FIG. 7, a cleaning unit 340 according to an example embodiment includes, for example, a body 342, a nozzle 344, a supply pipe 346, a discharge member 348, and a driving unit 350.

The body 342 may have a hollow cylindrical shape, as an example. The body 342 may be configured to move between a central portion and an edge of a wafer W. For example, when cleaning water is sprayed through the discharge member 348, the body 342 may move from the central portion to the edge of the wafer W or from the edge to the central portion of the wafer W.

The nozzle 344 may be disposed in a central portion of the body 342. Meanwhile, a supply pipe 346 is connected to the nozzle 344 and a mixing unit 344*a* in which a cleaning substance supplied through the supply pipe 346 are mixed may be provided. The mixing unit 344*a* may be provided in a lower end portion of the nozzle 344, and the cleaning material supplied through the supply pipe 346 may be mixed in the mixing unit 344*a* and then discharged to the wafer W through the discharge member 348.

The supply pipe 346 may include a first supply pipe 346*a* connected to the nozzle 344 and supplied with a first fluid, and a second supply pipe 346*b* connected to the nozzle 344 and supplied with a second fluid. As an example, the first fluid may be a mixed fluid of distilled water in a liquid state and carbon dioxide in a gaseous state, and the second fluid may be nitrogen in a gaseous state. Meanwhile, the first supply pipe 346*a* and the second supply pipe 346*b* may be wound around the nozzle 344 and then connected to the mixing unit 344*a* provided in the nozzle 344. As described above, because the first and second supply pipes 346*a* and 346*b* are connected to the mixing unit 344*a* disposed in the lower end portion of the nozzle 344, nitrogen gas, distilled water, and carbon dioxide gas may be maintained in a separated state so that the cleaning power by the cleaning water may be increased.

The discharge member 348 is installed on a bottom surface of the nozzle 344, and discharges cleaning water. Meanwhile, the discharge member 348 may spray cleaning water while being rotated, and the discharge member 348 may have a spraying hole 148*a* (see FIG. 3) through which cleaning water is sprayed. As an example, the nozzle 148*a* may have an 'X' shape as illustrated in FIG. 3. Meanwhile, a tooth unit 348*b* connected to a power transmission member 350*b* connected to a driving source 350*a* of the driving unit 350 may be provided on a side surface of the discharge member 348. Accordingly, the discharge member 348 may spray cleaning water while being rotated in forward and reverse directions by the driving source 350*a*. As an example, the driving source 350*a* may be a DC motor. As described above, the discharge member 348 may be connected to the driving unit 350 and only the discharge member 348 may be rotated to spray cleaning water.

Figure 8:
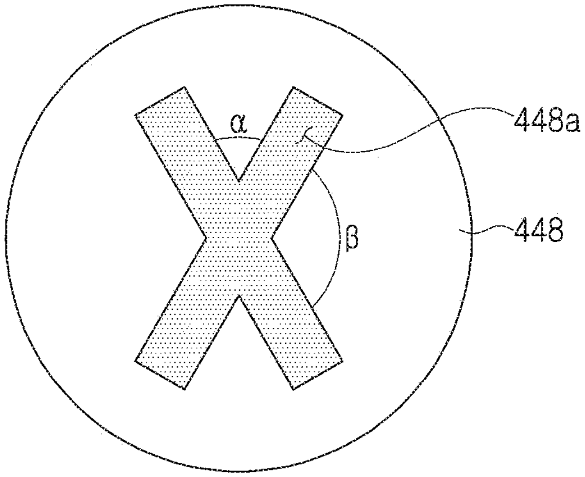
FIG. 8 is a bottom view illustrating a discharge member of a cleaning unit according to an example embodiment.

FIG. 8 is an explanatory diagram illustrating a discharge port of a cleaning unit according to an example embodiment.

A spraying port 448*a* of a discharge member 448 may have an 'X' shape. Meanwhile, as illustrated in FIG. 8, an angle between two bars of the 'X' shape may be an acute angle $\alpha$ and an obtuse angle $\beta$.

Figure 9:
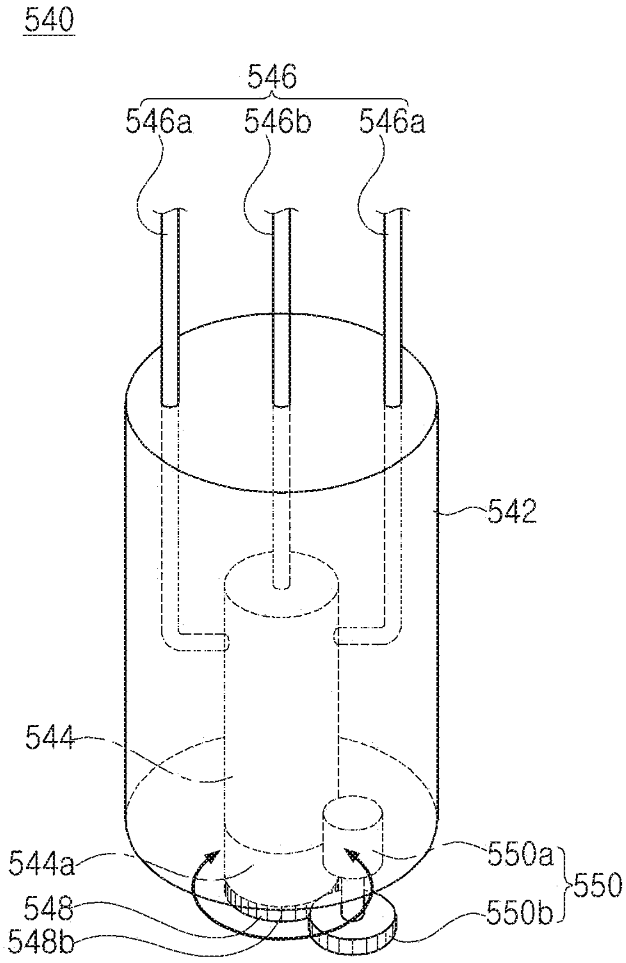
FIG. 9 is a configuration diagram illustrating a cleaning unit of a wafer cleaning apparatus according to an example embodiment.

FIG. 9 is a configuration diagram illustrating a cleaning unit of a wafer cleaning apparatus according to an example embodiment.

Referring to FIG. 9, as an example, a cleaning unit 540 according to an example embodiment includes a body 542, a nozzle 544, a supply pipe 546, a discharge member 548, and a driving unit 550.

As an example, the body 542 may have a hollow cylindrical shape. The body 542 may be configured to move between a central portion and an edge of a wafer W. As an example, when cleaning water is sprayed through the discharge member 548, the body 542 may move from the central portion to the edge of the wafer W or from the edge to the central portion of the wafer W.

The nozzle 544 may be disposed in a central portion of the body 542. Meanwhile, a supply pipe 546 may be connected to the nozzle 544 may include a mixing unit 544*a* in which a cleaning substance supplied from the supply pipe 546 is mixed.

The mixing portion 544*a* may be provided in a lower end portion of the nozzle 544, and the cleaning substance supplied through the supply pipe 546 is mixed in the mixing unit 544*a* and then discharged to the wafer W through the discharge member 548.

The supply pipe 546 may include a first supply pipe 546*a* connected to the nozzle 544 and supplied with a first fluid, and a second supply pipe 546*b* connected to the nozzle 544 and supplied with a second fluid. As an example, the first fluid may be a fluid in which distilled water in a liquid state and carbon dioxide in a gaseous state are mixed, and the second fluid may be nitrogen in a gaseous state.

The discharge member 548 is installed on a bottom surface of the nozzle 54, and discharges cleaning water. Meanwhile, the discharge member 548 may spray cleaning water while being rotated, and the discharge member 548 may have a spraying port (not shown) through which cleaning water is sprayed. As an example, the spraying port may have an 'X' shape as illustrated in FIG. 3. Meanwhile, a tooth unit 548*b* coupled to a power transmission member 550*b* connected to a driving source 550*a* of the driving unit 550 may be provided on a side surface of the discharge member 548. Accordingly, the discharge member 548 may spray cleaning water while being rotated in forward and reverse directions by the driving source 550*a*. As an example, the driving source 550*a* may be a DC motor.

As described above, the discharge member 548 may be connected to the driving unit 550 and only the discharge member 548 may spray cleaning water while being rotated.

As set forth above, according to the present inventive concepts, wafer cleaning devices capable of improving removal force of particles may be provided.

The various beneficial advantages and effects of the present inventive concepts are not limited to the above description, and will be more easily understood in the process of describing the above-described specific example embodiments of the present inventive concepts.

While some example embodiments have been shown and described above, it will be apparent to those skilled in the art that modifications and variations could be made without departing from the scope of the present inventive concepts as defined by the appended claims.

What is claimed is:

1. A wafer cleaning apparatus, comprising:

a rotating plate configured to support a wafer thereon; and a cleaning unit above the rotating plate and configured to spray cleaning water, wherein the cleaning unit includes, a body configured to move between a central portion and an edge portion of the wafer to be placed on the rotating plate, during a cleaning process, a nozzle in the body, at least one supply pipe connected to the nozzle and configured to supply a cleaning substance, and a discharge member at a lower end portion of the nozzle and configured to discharge the cleaning water, while being rotated in forward and reverse directions, the cleaning water including the cleaning substance, wherein the discharge member has a spraying port configured to spray the cleaning water therethrough, and wherein the spraying port has an X shape.

2. The wafer cleaning apparatus of claim 1, wherein the discharge member is configured to rotate in conjunction with the body when spraying the cleaning water.

3. The wafer cleaning apparatus of claim 2, wherein the body is configured to be rotatable in forward and reverse directions.

4. The wafer cleaning apparatus of claim 1, further comprising:

a driving unit on a side of the discharge member and including a driving source and a power transmission member connected to the driving source; and a tooth unit on a side surface of the discharge member and coupled to the power transmission member.

5. The wafer cleaning apparatus of claim 1, wherein the at least one supply pipe comprises a first supply pipe connected to the nozzle and configured to supply a first fluid, and a second supply pipe connected to the nozzle and configured supply a second fluid.

6. The wafer cleaning apparatus of claim 5, wherein the nozzle further comprises a mixing unit configured to mix the first fluid and the second fluid therein.

7. The wafer cleaning apparatus of claim 6, wherein the mixing unit is at a lower end portion of the body.

8. The wafer cleaning apparatus of claim 6, wherein the first supply pipe and the second supply pipe are wound around the nozzle and connected to the mixing unit.

9. The wafer cleaning apparatus of claim 5, wherein the at least one supply pipe further comprises a mixing pipe connected to the first supply pipe and the second supply pipe and configured to mix the first fluid and the second fluid therein, and the mixing pipe is connected to a flow path of the nozzle.

10. The wafer cleaning apparatus of claim 9, wherein the mixing pipe is wound around the nozzle and connected to the nozzle.

11. The wafer cleaning apparatus of claim 2, wherein an angle between two bars of the X shape is 90 degrees.

12. The wafer cleaning apparatus of claim 2, wherein angles between two bars of the X shape have an acute angle and an obtuse angle.

13. The wafer cleaning apparatus of claim 1, further comprising:

a chamber having the rotating plate and the cleaning unit therein.

14. A wafer cleaning apparatus, comprising:

a rotating plate configured to support a wafer thereon; and a cleaning unit above the rotating plate and configured to spray cleaning water, wherein the cleaning unit includes, a body above the rotating plate and configured to move between a central portion and an edge portion of the wafer to be placed on the rotating plate, during a cleaning process, a nozzle in the body, at least one supply pipe connected to the nozzle and configured to supply a cleaning substance, and a discharge member at a lower end portion of the nozzle and configured to discharge the cleaning water, while being rotated in forward and reverse directions, the cleaning water including the cleaning substance, and wherein the discharge member includes a spraying port, the spraying port having an X shape and configured to spray the cleaning water therethrough while being rotated.

* * * * *